(12) United States Patent
Chang

(10) Patent No.: US 8,967,814 B2
(45) Date of Patent: Mar. 3, 2015

(54) IMAGING LENS WITH ENHANCEMENT OF BLOCKING STRAY LIGHT

(71) Applicant: Genius Electronic Optical Co., Ltd., Taichung (TW)

(72) Inventor: Kuo-Wen Chang, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 206 days.

(21) Appl. No.: 13/793,284

(22) Filed: Mar. 11, 2013

(65) Prior Publication Data
US 2014/0104691 A1   Apr. 17, 2014

(30) Foreign Application Priority Data
Oct. 16, 2012   (CN) .......................... 2012 1 0391838

(51) Int. Cl.
*G03B 11/04* (2006.01)
*G02B 13/00* (2006.01)
*G02B 7/02* (2006.01)

(52) U.S. Cl.
CPC ...... *G02B 7/02* (2013.01); *G02B 7/021* (2013.01); *G02B 13/0035* (2013.01); *G02B 13/004* (2013.01); *G02B 13/0045* (2013.01)
USPC ............................. 359/611; 359/601; 359/740

(58) Field of Classification Search
CPC ....................................................... G02B 7/10
USPC .......................................................... 359/611
See application file for complete search history.

(56) References Cited

U.S. PATENT DOCUMENTS

| 8,320,059 B2 * | 11/2012 | Lin | .............................. 359/740 |
| 2013/0063822 A1 * | 3/2013 | Lin | .............................. 359/601 |

FOREIGN PATENT DOCUMENTS

| TW | 201003165 A | 1/2010 |
| TW | 201116876 A1 | 5/2011 |
| TW | 201224640 A1 | 6/2012 |

OTHER PUBLICATIONS

Search Report appended in an Office action issued to Taiwanese counterpart Application No. 101148386 by the Taiwan Intellectual Property Office on Jul. 3, 2014 along with an English translation thereof.

\* cited by examiner

*Primary Examiner* — Suchin Parihar
*Assistant Examiner* — Daniel Kassaye
(74) *Attorney, Agent, or Firm* — Baker & McKenzie LLP

(57) ABSTRACT

An imaging lens includes a lens barrel having a base wall with a light incident hole around an optical axis, an imaging unit disposed in the lens barrel and including imaging components arranged along the optical axis, and a light shielding plate having an annular fixing portion for positioning the light shielding plate and a bent portion bent from an inner periphery of the fixing portion and extending slantingly toward the optical axis. The light shielding plate is disposed at one of a position between the base wall and one of the imaging components that is adjacent to the base wall, and a position between two adjacent ones of the imaging components.

10 Claims, 12 Drawing Sheets

IMAGING LENS WITH ENHANCEMENT OF BLOCKING STRAY LIGHT

CROSS-REFERENCE TO RELATED APPLICATION

This application claims priority to Chinese Application No. 201210391838.9, filed on Oct. 16, 2012.

BACKGROUND OF THE INVENTION

1. Field of the Invention

The invention relates to an optical lens for capturing and recording images, and more particularly to an imaging lens that may alleviate affect of stray light.

2. Description of the Related Art

Referring to FIG. 1, a conventional imaging lens includes a lens barrel 11, lens components 121-124 disposed in the lens barrel 11 along an optical axis (I), and two light shielding components 125, 126 disposed between the lens components 121, 122, and between the lens components 123, 124, respectively. The light shielding components 125, 126 are disposed to block stray light for preventing degradation of image quality. However, the conventional light shielding components 125, 126 do not effectively block stray light at large incident angles. In FIG. 1, stray light 110 still can arrive at an imaging surface 127 of the imaging lens after reflection and refraction among the lens components 121~124 in the lens barrel 11, resulting in adverse effect on image quality. Therefore, it is required to provide an imaging lens that may effectively block most of stray light for promoting image quality.

Referring to FIG. 2, an imaging lens disclosed in Taiwanese patent application publication no. 201116876 is shown to include light shielding components 131, 132. The light shielding component 131 disposed between a first lens component 141 and a second lens component 144. A first non-optical surface 143 extends outwardly and slantingly from a periphery of a curved image-side surface 142 of a first lens component 141. A second non-optical surface 146 is outwardly extended from a periphery of a curved object-side surface 145 of a second lens component 144 to form two supporting portions 147, 148 to position the light shielding component 131, such that the light shielding component 131 is slantingly disposed along the first non-optical surface 143 of the first lens component 141 for blocking stray light at non-optical surfaces of the first and second lens components 141, 144 and enhancing image quality. However, in this publication, the light shielding component 131 is firmly positioned only when the opposite non-optical surface configurations of the adjacent lens components are made to cooperate with each other. For example, in FIG. 2, if the inclined image-side non-optical surface 143 of the first lens component 141 is too narrow, a surface area of the object-side non-optical surface 146 of the second lens component 144 for supporting portion design may be too small for two or more supporting portions to be configured thereon. In this case, since it is not sufficient to use only one supporting portion to support the light shielding component 131 that is slantingly disposed, the light shielding component 131 is not firmly positioned between the first and second lens components 141 and 144. In addition, due to the small thickness of the light shielding component 131, when the light shielding component 131 is positioned between a non-planar surface (e.g., the non-optical surface 146 as shown in FIG. 2) and a planar surface (e.g., the non-optical surface 143 as shown in FIG. 2), the light shielding component 131 may be easily deformed, resulting in adverse effects on assembly precision, light shielding, and image quality.

SUMMARY OF THE INVENTION

Therefore, an object of the present invention is to provide an imaging lens including a light shielding plate that can block stray light and can achieve relatively better assembly precision.

According to the present invention, an imaging lens comprises:

a lens barrel including a base wall formed with a light incident hole around an optical axis of the imaging lens and disposed proximate to an object side, and a surrounding wall that extends from an outer periphery of the base wall toward an image side, and that cooperates with the base wall to define a receiving space;

an imaging unit disposed in the receiving space of the lens barrel, and including a plurality of imaging components arranged along the optical axis in an order, each of the imaging components having an annular front contact surface facing toward the object side and an annular back contact surface facing toward the image side; and a light shielding plate having a fixing portion that is planar and annular, and a bent portion bent from an inner periphery of said fixing portion and extending slantingly toward the optical axis, said light shielding plate being disposed at one of:

a first position between said base wall and one of said imaging components that is adjacent to said base wall of said lens barrel, said fixing portion being located between said base wall and said front contact surface of said one of said imaging components that is adjacent to said base wall of said lens barrel; and a second position between two adjacent ones of said imaging components, said fixing portion being located between said back contact surface of one of the two adjacent ones of said imaging components that is disposed at the object side of said light shielding plate and said front contact surface of the other one of said two adjacent ones of said imaging components.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
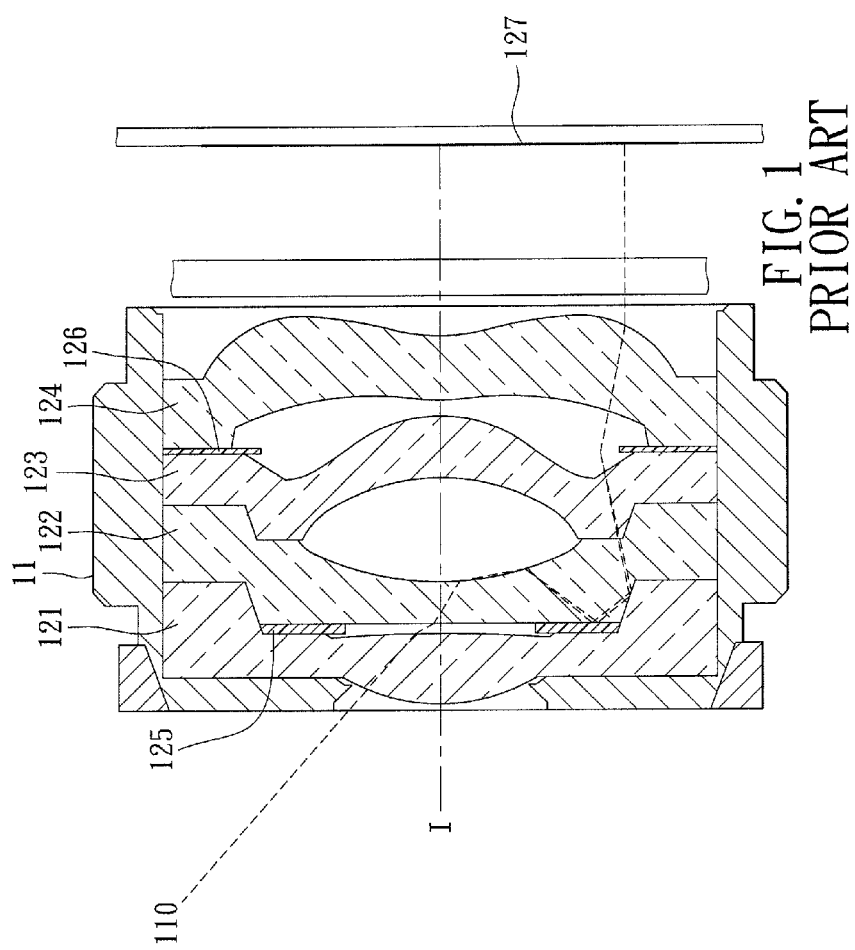
FIG. 1 is a schematic diagram showing a conventional imaging lens.
Figure 2:
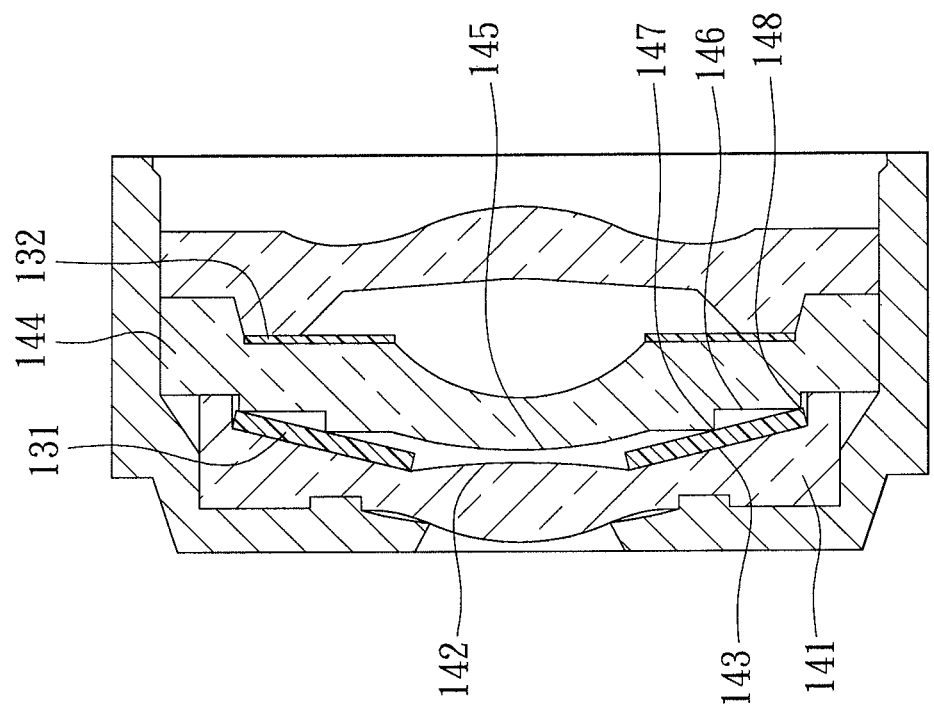
FIG. 2 is a schematic diagram showing another conventional imaging lens.

Before the present invention is described in greater detail, it should be noted that like elements are denoted by the same reference numerals throughout the disclosure.

Figure 3:
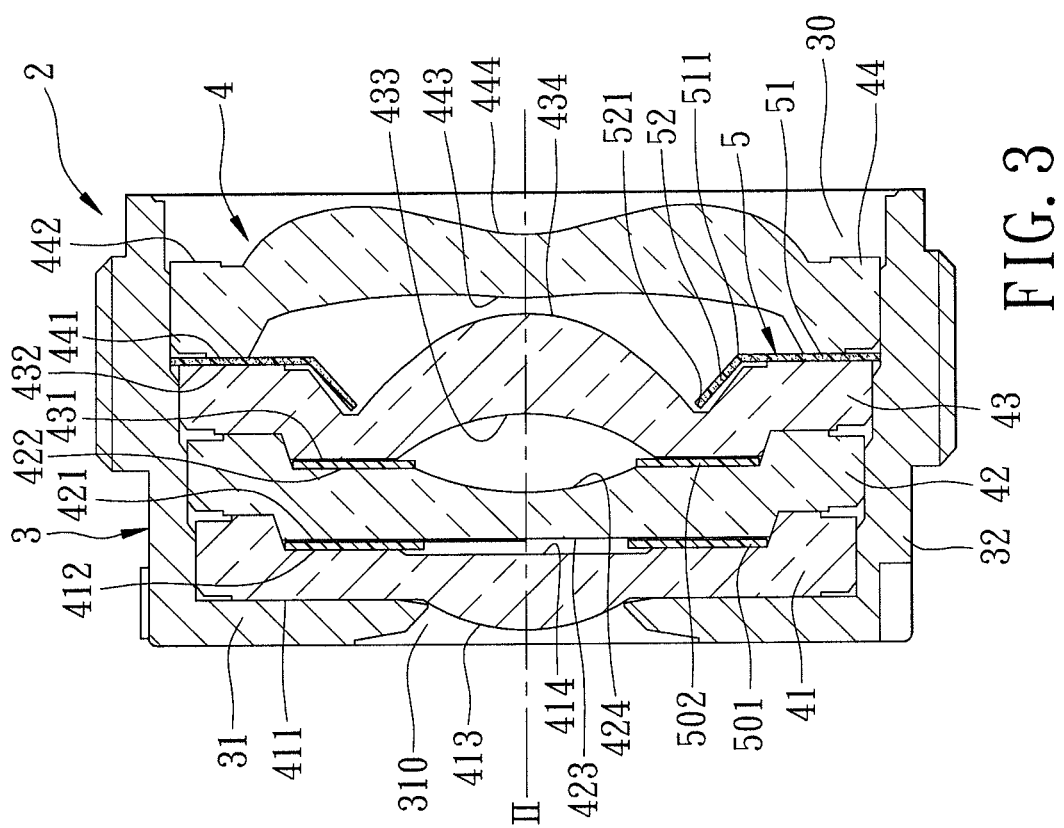
FIG. 3 is a schematic diagram showing a first preferred embodiment of the imaging lens according to the present invention.
Figure 4:
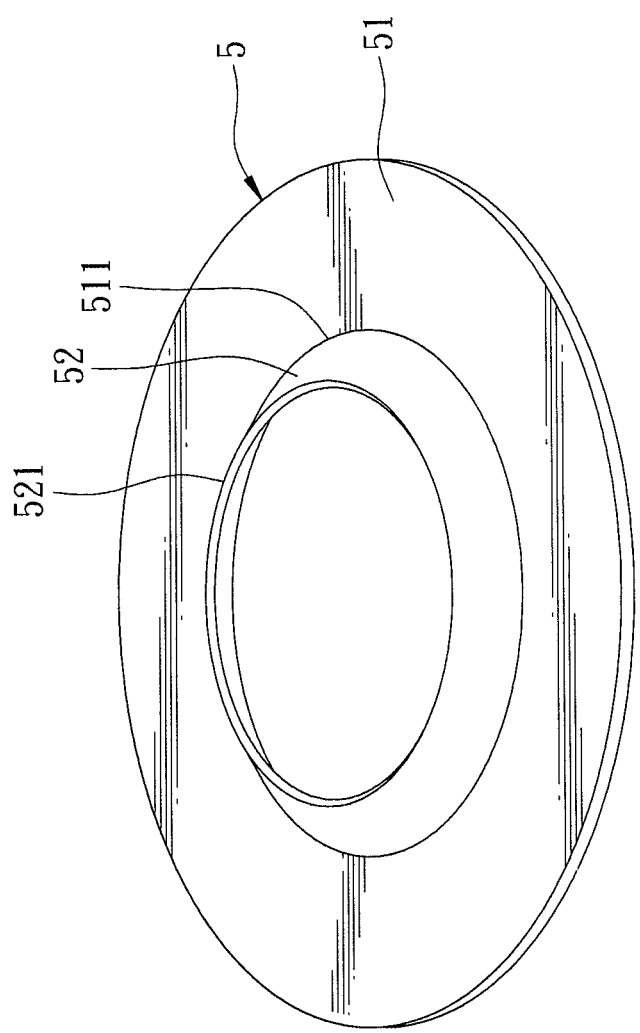
FIG. 4 is a perspective view showing a configuration of a light shielding plate of the first preferred embodiment.

Referring to FIG. 3 and FIG. 4, a first preferred embodiment of the imaging lens 2 according to this invention is shown to include a lens barrel 3, an imaging unit 4 disposed in the lens barrel 3, and three light shielding plates 501, 502, 5 disposed in the imaging unit 4 and spaced apart from each other.

The lens barrel 3 includes a base wall 31 formed with a light incident hole 310 around an optical axis (II) of the imaging lens 2 and disposed proximate to an object side, and a surrounding wall 32 that extends from an outer periphery of the base wall 31 toward an image side, and that cooperates with the base wall 31 to define a receiving space 30.

The imaging unit 4 is disposed in the receiving space 30 of the lens barrel 3, and includes first, second, third, and fourth imaging components 41~44 arranged along the optical axis (II) in the given order from the object side to the image side. Each of the first, second, third, and fourth imaging components 41~44 is an optical lens, and has an annular front contact surface 411, 421, 431, 441 facing toward the object side, an annular back contact surface 412, 422, 432, 442 facing toward the image side, a curved object-side surface 413, 423, 433, 443 surrounded by the front contact surface 411, 421, 431, 441, and a curved image-side surface 414, 424, 434, 444 surrounded by the back contact surface 412, 422, 432, 442. It should be noted that the number of the imaging components of the imaging unit 4 is not limited.

The light shielding plate 501 is disposed between the back contact surface 412 of the first imaging component 41 and the front contact surface 421 of the second imaging component 42. The light shielding plate 502 is disposed between the back contact surface 422 of the second imaging component 42 and the front contact surface 431 of the third imaging component 43.

The light shielding plate 5 has a bent structure and is disposed between the third imaging component 43 and the fourth imaging component 44. However, in other embodiments, the light shielding plate 5 may be disposed at one of:
 a first position between the base wall 31 and the first imaging component 41 that is adjacent to the base wall 31 of the lens barrel 3, and
 a second position between two adjacent ones of the imaging components 41~44.

The light shielding plate 5 has a fixing portion 51 that is planar and annular, and a bent portion 52 bent from an inner periphery 511 of the fixing portion 51 and extending slantingly toward the optical axis (II). The fixing portion 51 is located at one of:
 a position between the base wall 31 and the front contact surface 411 of the imaging components 41 that is adjacent to the base wall 31 of the lens barrel 3 when the light shielding plate 5 is disposed at the first position, and
 a position between the back contact surface 412~432 of one of the two adjacent ones of the imaging components 41~43 that is disposed at the object side of the light shielding plate 5 and the front contact surface 421~441 of the other one of the two adjacent ones of the imaging components 42~44 when the light shielding plate 5 is disposed at the second position.

Figure 5:
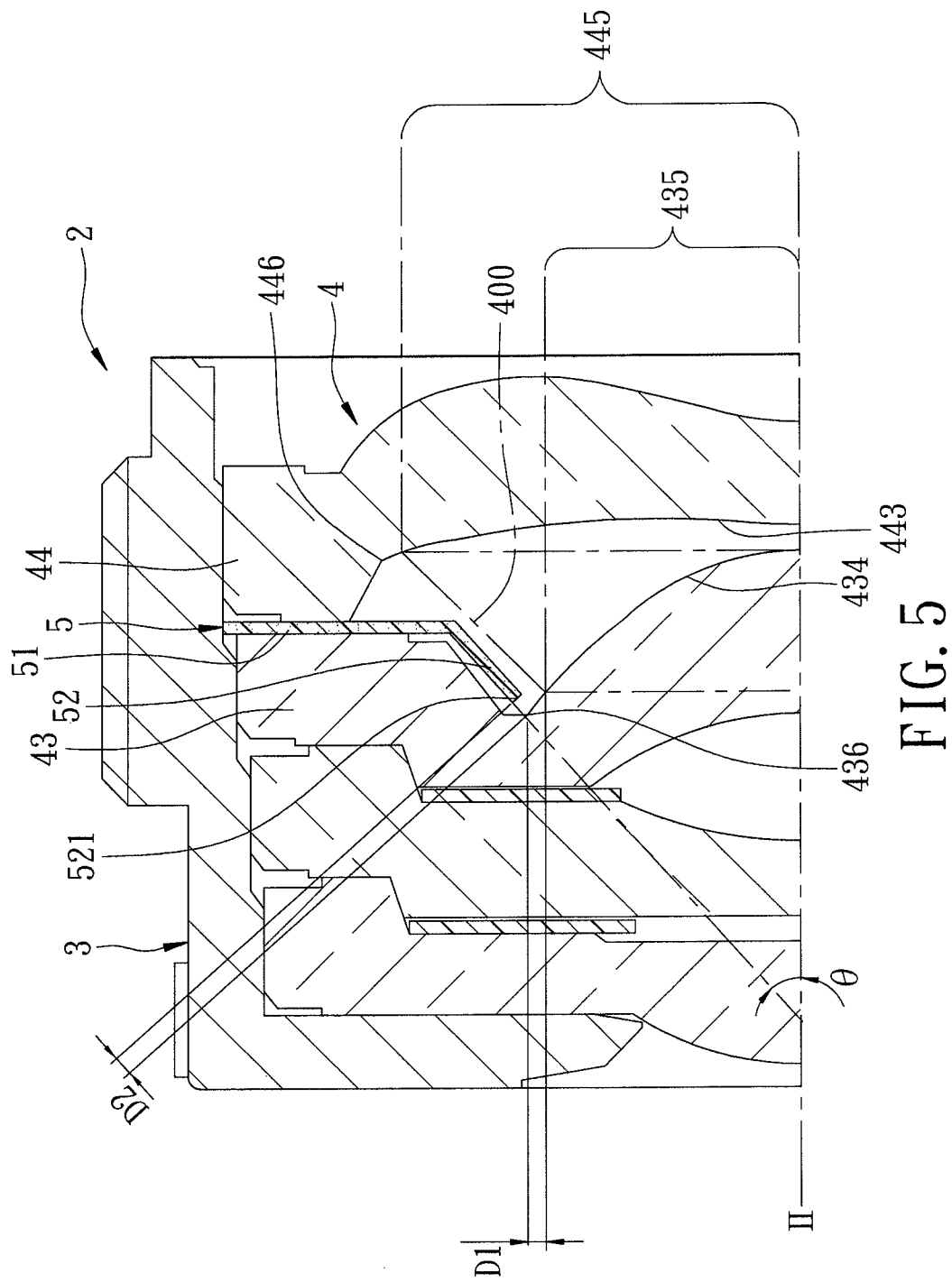
FIG. 5 is a fragmentary view of an upper part in FIG. 3 illustrating a relationship between the light shielding plate and a third lens element of the first preferred embodiment.

Further referring to FIG. 5, the object-side surface 443 of the fourth imaging component 44 has an optical effective diameter area 445 for passage of light for imaging, and the image-side surface 434 of the third imaging component 43 has an optical effective diameter area 435 for passage of light for imaging. An imaging light boundary surface 400 (see FIG. 6) is defined between the optical effective diameter areas 445, 435. The imaging light boundary surface 400 extends from a periphery of the optical effective diameter area 435 of the image-side surface 434 of the third imaging component 43 to a periphery of the optical effective diameter area 445 of the object-side surface 443 of the fourth imaging component 44. The bent portion 52 of the light shielding plate 5 is spaced apart from the imaging light boundary surface 400 so as to prevent light for imaging from being blocked by the light shielding plate 5. In addition, a periphery of each of the object-side surface 443 of the fourth imaging component 44 and the image-side surface 434 of the third imaging component 43 defines a light-passing boundary periphery 446, 436.

The optical effective diameter refers to a diameter of a region of an object-side surface or an image-side surface of a lens through which effective imaging light passes. It should be noted that, in the conventional lens design of an imaging lens, for the object-side surface or the image-side surface of a lens, the periphery of the optical effective diameter area is typically spaced apart from the light-passing boundary periphery by a distance D1 ranging between 0.1 mm and 0.2 mm. Since FIG. 5 is a fragmentary view of an upper part of FIG. 3, only one half of the optical effective diameter areas 435, 445 are shown therein. In this embodiment, each of the object-side surfaces 413~443 and the image-side surfaces 414~444 of the first, second, third, and fourth imaging components 41~44 has its own optical effective diameter area and the light-passing boundary periphery as illustrated for the image-side surface 434 of the third imaging component 43 and the object-side surface 443 of the fourth imaging component 44, and details of the same are not repeated herein.

The bent portion 52 of the light shielding plate 5 extends toward the optical axis (II) and the third imaging component 43, and an included angle θ of an extension surface of the bent portion 52 and the optical axis (II) is 41.2°. For ensuring blockage of stray light and alleviating the effect of lower light transmittance, an inner periphery 521 of the bent portion 52 of the light shielding plate 5 is spaced apart from an adjacent light-passing boundary periphery 436 of the third imaging component 43 by a distance D2 preferably ranging between 0.1 mm and 0.4 mm. According to experimental results, it is found that the inner periphery 521 may contact the image-side surface 434 of the third imaging component 43 due to manufacturing tolerance of the light shielding plate 5 when the distance D2 between the inner, periphery 521 of the bent portion 52 and the light-passing boundary periphery 436 of the third imaging component 43 is less than 0.1 mm, resulting in adverse effect on light transmittance and image brightness. On the other hand, when the distance D2 between the inner periphery 521 of the bent portion 52 and the light-passing boundary periphery 436 of the third imaging component 43 is greater than 0.4 mm, the effect of stray light elimination is reduced, and image quality is thus affected.

The light shielding plate 5 may be made of a black plastic material or a black thin film. The light shielding plate 5 made by injection molding using the black plastic material has better precision in size, and may prevent reduction of the stray light blocking effect resulting from manufacturing inaccuracy. By stamping process using the black thin film, the light shielding plate 5 may be made thinner, such as 0.02 mm in thickness, so as to be suitable to be employed when the two adjacent imaging components are very close to each other. In addition, the stray light due to the manufacturing quality may be prevented by promoting quality of the edge portion of the light shielding plate 5, as an example, to reduce burrs at the edge portion. By the aforementioned process, the light shielding plate 5 has superior mechanical and physical properties, stable structural strength, and good precision in size.

Figure 6:
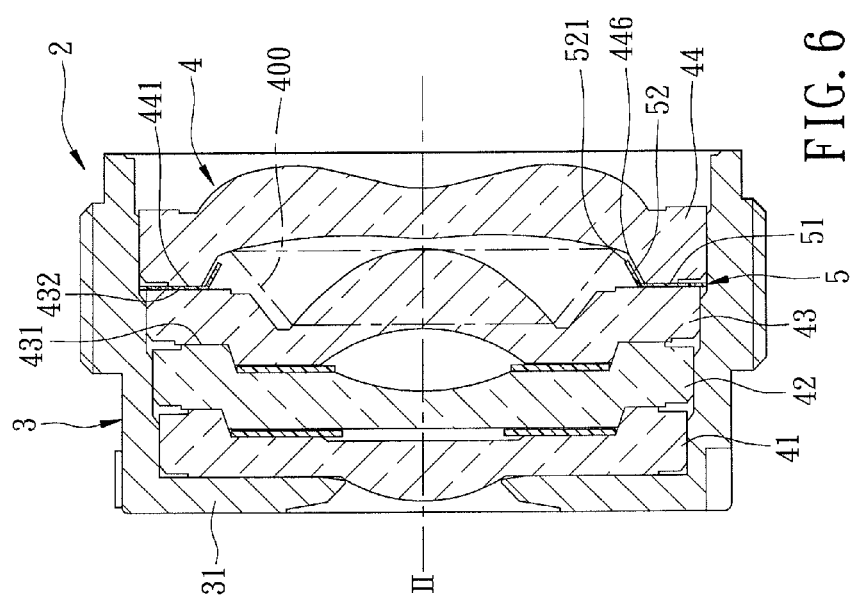
FIG. 6 is a schematic diagram showing a modification of the first preferred embodiment.

It should be noted that, based on the requirement, the bent portion 52 of the light shielding plate 5 may be designed to extend toward the optical axis (II) and the fourth imaging component 44, as shown in FIG. 6. The inner periphery 521 of the bent portion 52 is spaced apart from an adjacent light-passing boundary periphery 446 of the fourth imaging component 44 by a distance ranging between 0.1 mm and 0.4 mm. Such a design may also block stray light without reduction of light transmittance. Number of the light shielding plates 5 that have the bent portion 52 is not limited in this invention. The light shielding plates 5 may be disposed between any two adjacent ones of the first, second, third, and fourth imaging components 41~44 or between the base wall 31 of the lens barrel 3 and the first imaging component 41.

Figure 7:
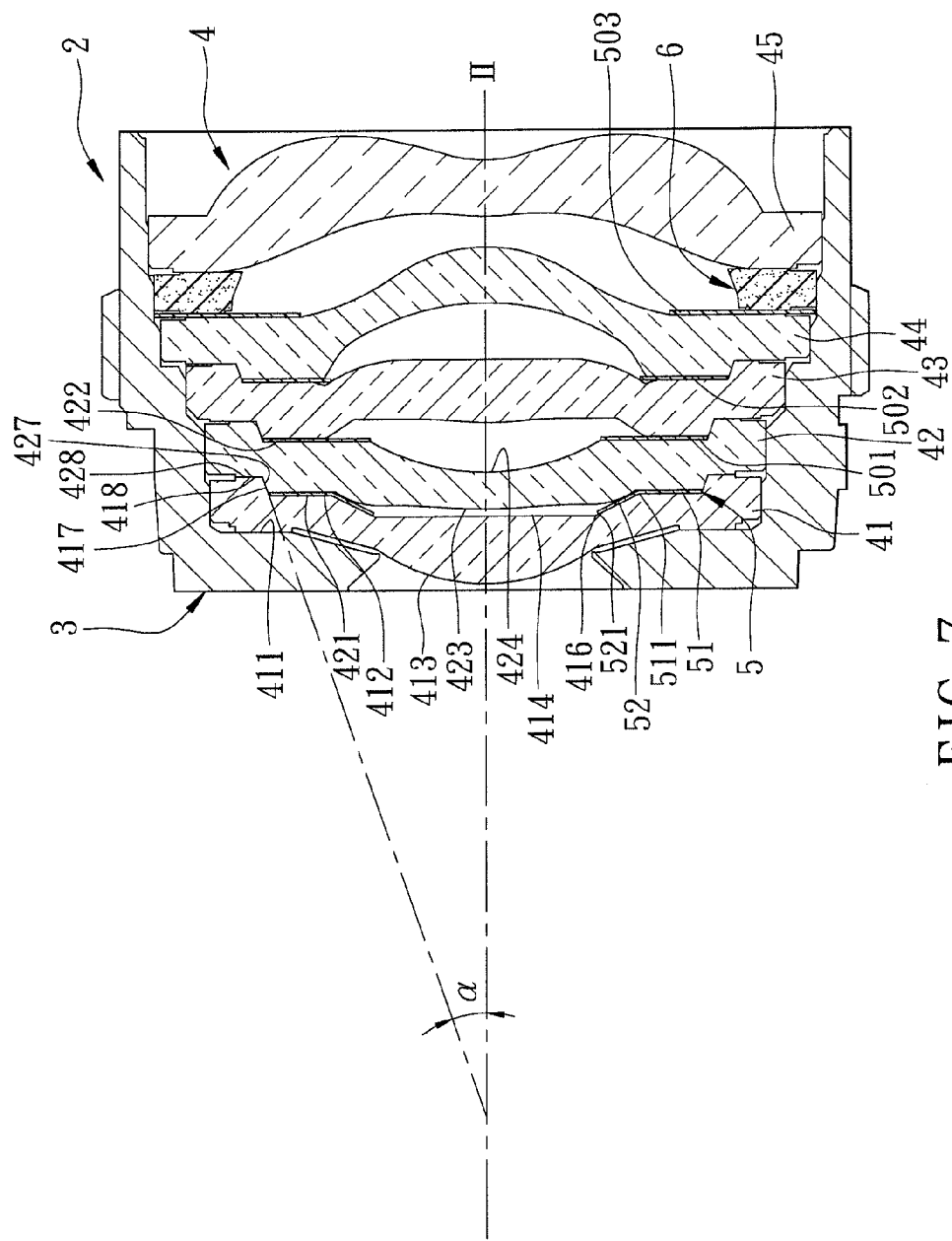
FIG. 7 is a schematic diagram showing a second preferred embodiment of the imaging lens according to the present invention.

Referring to FIG. 7, a second preferred embodiment of the imaging lens 2 is shown to include a lens barrel 3, an imaging unit 4 disposed in the lens barrel 3, and four light shielding plates 5, 501, 502, 503 disposed in the imaging unit 4 in the given order from the object side to the image side and spaced apart from each other.

The difference between the first and second preferred embodiments of the imaging lens 2 of this invention resides in that: the imaging unit 4 includes first, second, third, fourth, and fifth imaging components 41~45 disposed along the optical axis (II) in the given order from the object side to the image side, and the imaging lens 2 further includes a washer 6 disposed between the fourth and fifth imaging components 44, 45 for adjusting distance between the fourth and fifth imaging components 44, 45. The light shielding plate 5 is disposed between the first imaging component 41 and the second imaging component 42 in a different manner from the first preferred embodiment.

The light shielding plate 5 has a fixing portion 51 that is planar and annular and that is located between the back contact surface 412 of the first imaging component 41 and the front contact surface 421 of the second imaging component 42, and a bent portion 52 bent from an inner periphery 511 of the fixing portion 51. The bent portion 52 slantingly extends toward the optical axis (II) and the first imaging component 41, and an included angle of an extension surface of the bent portion 52 and the optical axis (II) is 63.3°. The bent portion 52 of the light shielding plate 5 is spaced apart from an imaging light boundary surface, which is defined using an optical effective diameter area of the image-side surface 414 of the first imaging component 41 and an optical effective diameter area of the object-side surface 423 of the second imaging component 42 as illustrated in the first preferred embodiment. In addition, a periphery of the image-side surface 414 of the first imaging component 41 defines a light-passing boundary periphery 416. The inner periphery 521 of the bent portion 52 of the light shielding plate 5 is spaced apart from the adjacent light-passing boundary periphery 416 of the first imaging component 41 by a distance preferably ranging between 0.1 mm and 0.4 mm.

The first imaging component 41 further has a back linking surface 417 slantingly extending from an outer periphery of the back contact surface 412 toward the image side, and a back engaging surface 418 radially and outwardly extending from an outer periphery of the back linking surface 417. The second imaging component 42 further has a front linking surface 427 slantingly extending from an outer periphery of the front contact surface 421 toward the image side, and a front engaging surface 428 radially and outwardly extending from an outer periphery of the front linking surface 427. The front linking surface 427 and the front engaging surface 428 of the second imaging component 42 are configured to be suitable for being engaged respectively with the back linking surface 417 and the back engaging surface 418 of the first imaging component 41. During experiments, it is found that if the slopes of the back linking surface 417 and the front linking surface 427 are too large, the light shielding plate 5 may be difficult to be positioned between the first and second imaging components 41, 42. In this embodiment, the included angle α of an extension surface of the back linking surface 417 and the optical axis (II) is preferable to be smaller than 20 degrees.

In other embodiments, the back linking surface 417 of the first imaging component 41 may be designed to be orthogonal to the back contact surface 412 of the first imaging component 41, and the front linking surface 427 of the second imaging component 42 may be correspondingly designed to be orthogonal to the front contact surface 421 of the second imaging component 42.

Figure 8:
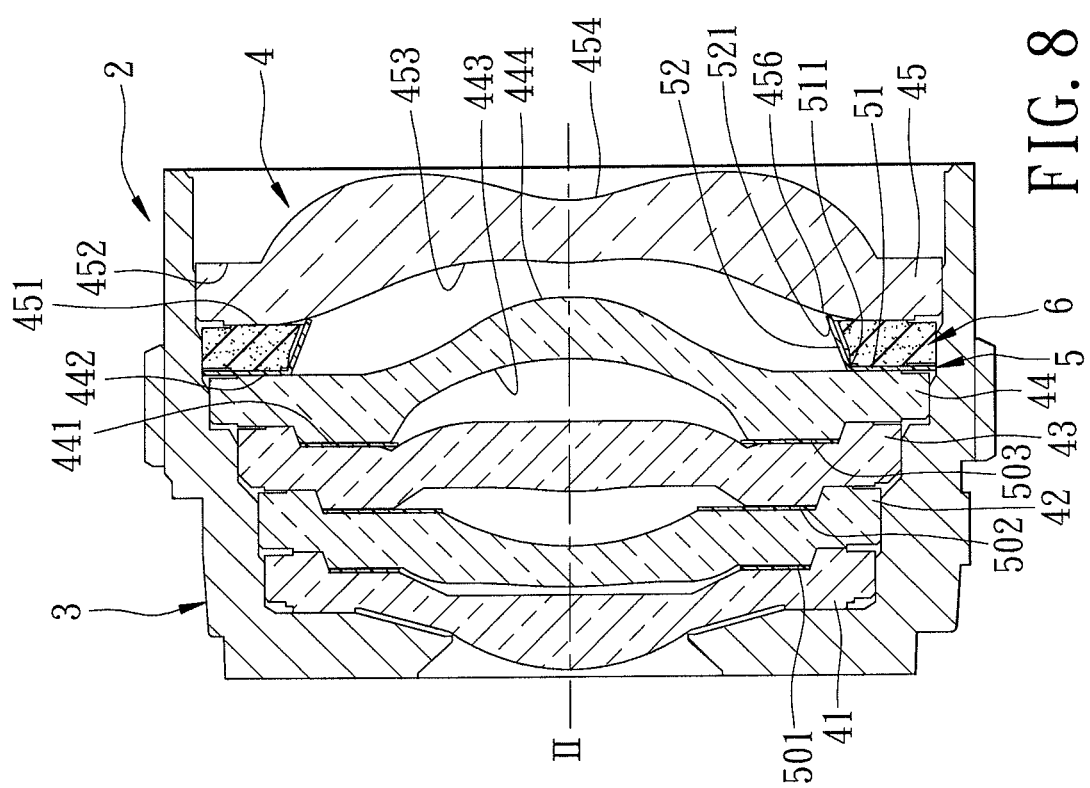
FIG. 8 is a schematic diagram showing a third preferred embodiment of the imaging lens according to the present invention.

Referring to FIG. 8, a third preferred embodiment of the imaging lens 2 is shown to include a lens barrel 3, an imaging unit 4 disposed in the lens barrel 3, four light shielding plates 501, 502, 503, 5 disposed in the imaging unit 4 in the given order from the object side to the image side and spaced apart from each other, and a washer 6. The light shielding plate 5 has a bent structure.

The imaging unit 4 includes first, second, third, fourth, and fifth imaging components 41~45 disposed along the optical axis (II) in the given order from the object side to the image side, and the washer 6 is disposed between the fourth and fifth imaging components 44, 45.

The difference between the second and third preferred embodiments of the imaging lens 2 of this invention resides in that: the light shielding plate 5 is disposed between the fourth imaging component 44 and the washer 6.

The washer 6 is disposed between the back contact surface 442 of the fourth imaging component 44 and the front contact surface 451 of the fifth imaging component 45. The light shielding plate 5 has a fixing portion 51 that is planar and annular and that is located between the back contact surface 442 of the fourth imaging component 44 and the washer 6, and a bent portion 52 bent from an inner periphery 511 of the fixing portion 51. The bent portion 52 slantingly extends toward the optical axis (II) and the fifth imaging component 45.

The bent portion 52 of the light shielding plate 5 is spaced apart from an imaging light boundary surface, which is defined using an optical effective diameter area of the image-side surface 444 of the fourth imaging component 44 and an optical effective diameter area of the object-side surface 453 of the fifth imaging component 45 as illustrated in the first preferred embodiment. In addition, a periphery of the object-side surface 453 of the fifth imaging component 45 defines a light-passing boundary periphery 456. The inner periphery 521 of the bent portion 52 of the light shielding plate 5 is spaced apart from the adjacent light-passing boundary periphery 456 of the fifth imaging component 45 by a distance preferably ranging between 0.1 mm and 0.4 mm. In other embodiments, the light shielding plate 5 may be disposed between the washer 6 and the fifth imaging component 45, and the fixing portion 51 of the light shielding plate 5 may be located between the washer 6 and the front contact surface 451 of the fifth imaging component 45 as required.

Figure 9:
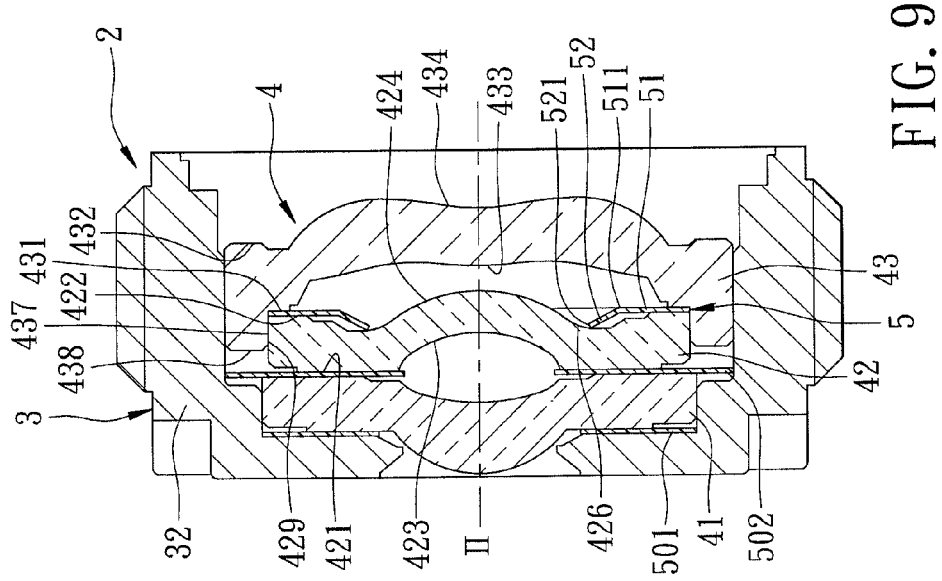
FIG. 9 is a schematic diagram showing a fourth preferred embodiment of the imaging lens according to the present invention.

Referring to FIG. 9, a fourth preferred embodiment of the imaging lens 2 is shown to include a lens barrel 3, an imaging unit 4 disposed in the lens barrel 3, and three light shielding plates 501, 502, 5 disposed in the imaging unit 4 in the given order from the object side to the image side and spaced apart from each other. The light shielding plate 5 has a bent structure.

The difference between the first and fourth preferred embodiments of the imaging lens 2 of this invention resides in that: the imaging unit 4 includes only first, second, and third imaging components 41~43 disposed along the optical axis (II) in the given order from the object side to the image side, and the light shielding plate 5 is disposed between the second imaging component 42 and the third imaging component 43. The second imaging component 42 does not directly abut against the surrounding wall 32 of the lens barrel 3.

The light shielding plate 5 has a fixing portion 51 that is planar and annular and that is located between the back contact surface 422 of the second imaging component 42 and the front contact surface 431 of the third imaging component 43, and a bent portion 52 bent from an inner periphery 511 of the fixing portion 51. The bent portion 52 slantingly extends toward the optical axis (II) and the second imaging component 42, and an included angle of an extension surface of the bent portion 52 and optical axis (II) is 66.5°. The bent portion 52 of the light shielding plate 5 is spaced apart from an imaging light boundary surface, which is defined using an optical effective diameter area of the image-side surface 424 of the second imaging component 42 and an optical effective diameter area of the object-side surface 433 of the third imaging component 43 as illustrated in the first preferred embodiment. In addition, a periphery of the image-side surface 424 of the second imaging component 42 defines a light-passing boundary periphery 426. The inner periphery 521 of the bent portion 52 of the light shielding plate 5 is spaced apart from the adjacent light-passing boundary periphery 426 of the second imaging component 42 by a distance preferably ranging between 0.1 mm and 0.4 mm.

In this embodiment, the second imaging component 42 further has a back linking surface 429 orthogonally extending from an outer periphery of the back contact surface 422 toward the object side. The third imaging component 43 further has a front linking surface 437 orthogonally extending from an outer periphery of the front contact surface 431 toward the object side, and a front engaging surface 438 extending radially and outwardly from a distal periphery of the front linking surface 437. In this embodiment, the second imaging component 42 does not directly abut against the surrounding wall 32 of the lens barrel 3, and is positioned by engaging the back linking surface 429 thereof with the front linking surface 437 of the third imaging component 43.

Figure 10:
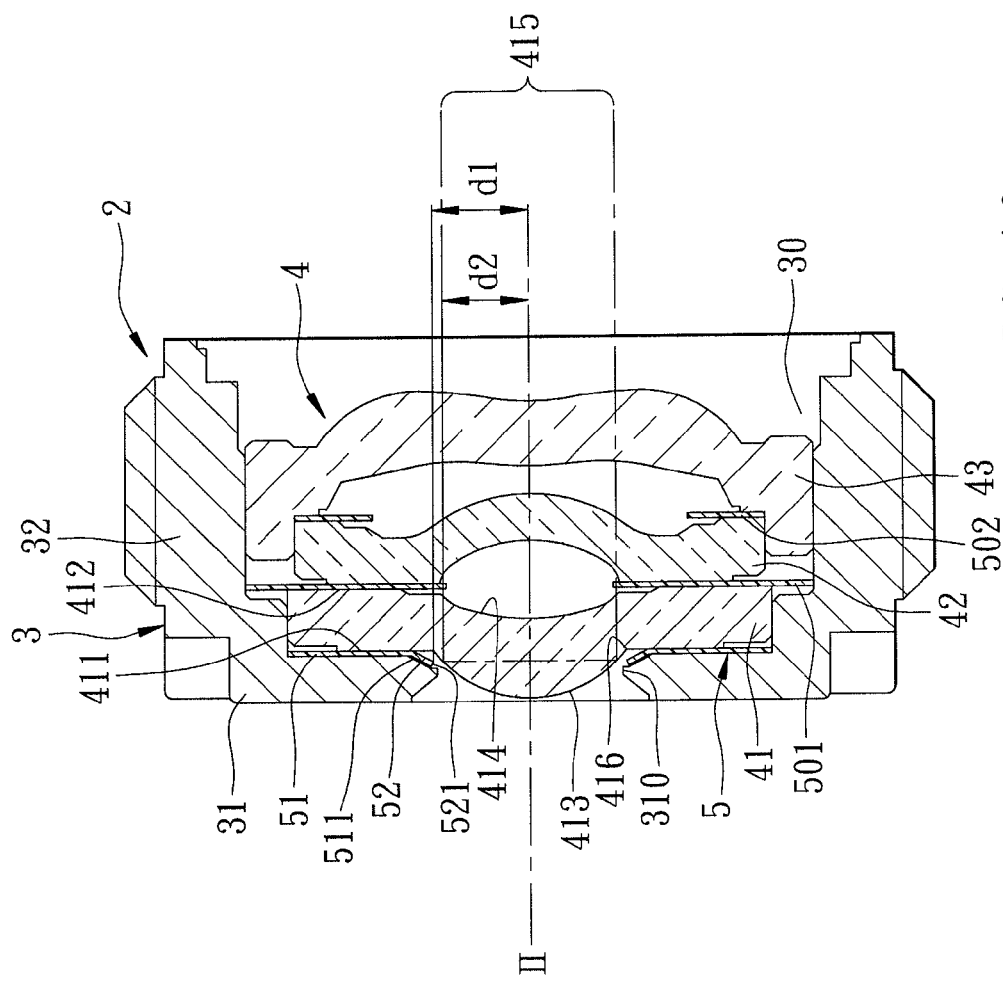
FIG. 10 is a schematic diagram showing a fifth preferred embodiment of the imaging lens according to the present invention.

Referring to FIG. 10, a fifth preferred embodiment of the imaging lens 2 is shown to include a lens barrel 3, an imaging unit 4 disposed in the lens barrel 3, and three light shielding plates 5, 501, 502 disposed in the imaging unit 4 in the given order from the object side to the image side and spaced apart from each other. The light shielding plate 5 has a bent structure.

The lens barrels 3 of the fifth and fourth preferred embodiments have the same configuration as illustrated in the first preferred embodiment, and the imaging unit 4 of the fifth preferred embodiment has the same configuration as that of the fourth preferred embodiment.

The difference between the fifth and fourth preferred embodiments of the imaging lens 2 of this invention resides in that: the light shielding plate 5 that has the bent structure is disposed between the base wall 31 of the lens barrel 3 and the first imaging component 41.

The light shielding plate 5 has a fixing portion 51 that is planar and annular and that is located between the base wall 31 of the barrel 3 and the front contact surface 411 of the first imaging component 41, and a bent portion 52 bent from an inner periphery 511 of the fixing portion 51. The bent portion 52 slantingly extends toward the optical axis (II) and the light incident hole 310, and an included angle of an extension surface of the bent portion 52 and the optical axis (II) is 66.7°. Preferably, a periphery of the object-side surface 413 of the first imaging component 41 defines a light-passing boundary periphery 416, and the first imaging component 41 has an optical effective diameter area 415 for passage of light for imaging. A distance between the inner periphery 521 of the bent portion 52 of the light shielding plate 5 and the optical axis (II) (which is denoted as d1) is greater than half a diameter of the optical effective diameter area 415 (which is denoted as d2). The inner periphery 521 of the bent portion 52 of the light shielding plate 5 is spaced apart from the adjacent light-passing boundary periphery 416 of the first imaging component 41 by a distance preferably ranging between 0.1 mm and 0.4 mm.

In this embodiment, the light shielding plate 5 is disposed between the base wall 31 and the first imaging component 41 for blocking stray light at large incident angles to enhance image quality.

Figure 11:
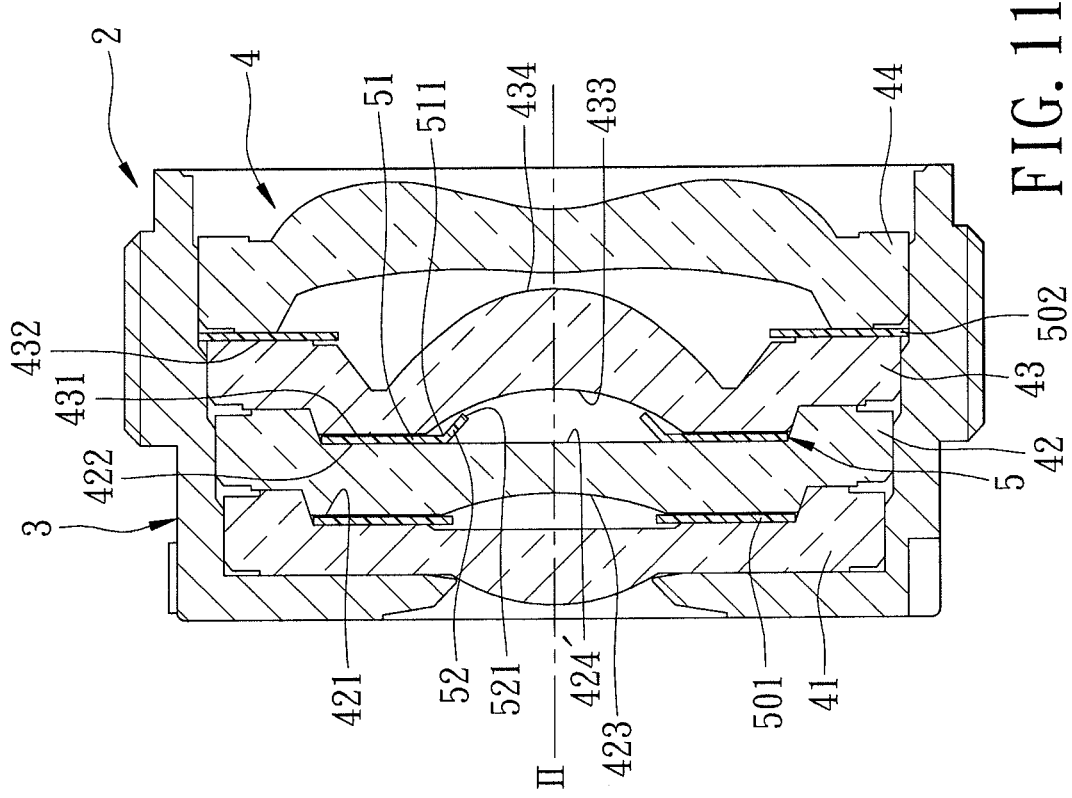
FIG. 11 is a schematic diagram showing a sixth preferred embodiment of the imaging lens according to the present invention.

Referring to FIG. 11, a sixth preferred embodiment of the imaging lens 2 is shown to include a lens barrel 3, an imaging unit 4 disposed in the lens barrel 3, and three light shielding plates 501, 5, 502 disposed in the imaging unit 4 in the given order from the object side to the image side and spaced apart from each other. The light shielding plate 5 has a bent structure, and the imaging unit 4 includes first, second, third, and fourth imaging components 41~44 disposed along the optical axis (II) in the given order from the object side to the image side.

The lens barrel 3 of the sixth preferred embodiment has the same configuration as the lens barrel 3 of the first preferred embodiment, and the difference between the first and sixth preferred embodiments of the imaging lens 2 of this invention resides in the position at which the light shielding plate 5 is disposed.

The second imaging component 42 has a planar image-side surface 424'. The light shielding plate 5 is disposed between the second and third imaging components 42, 43. The light shielding plate 5 has a fixing portion 51 that is planar and annular and that is located between the back contact surface 422 of the second imaging component 42 and the front contact surface 431 of the third imaging component 43, and a bent portion 52 bent from an inner periphery 511 of the fixing portion 51. The bent portion 52 slantingly extends toward the optical axis (II) and the third imaging component 43. In this embodiment, the light shielding plate 5 may still be steadily positioned via the fixing portion 51, and eliminate stray light using the bent portion 52.

Figure 12:
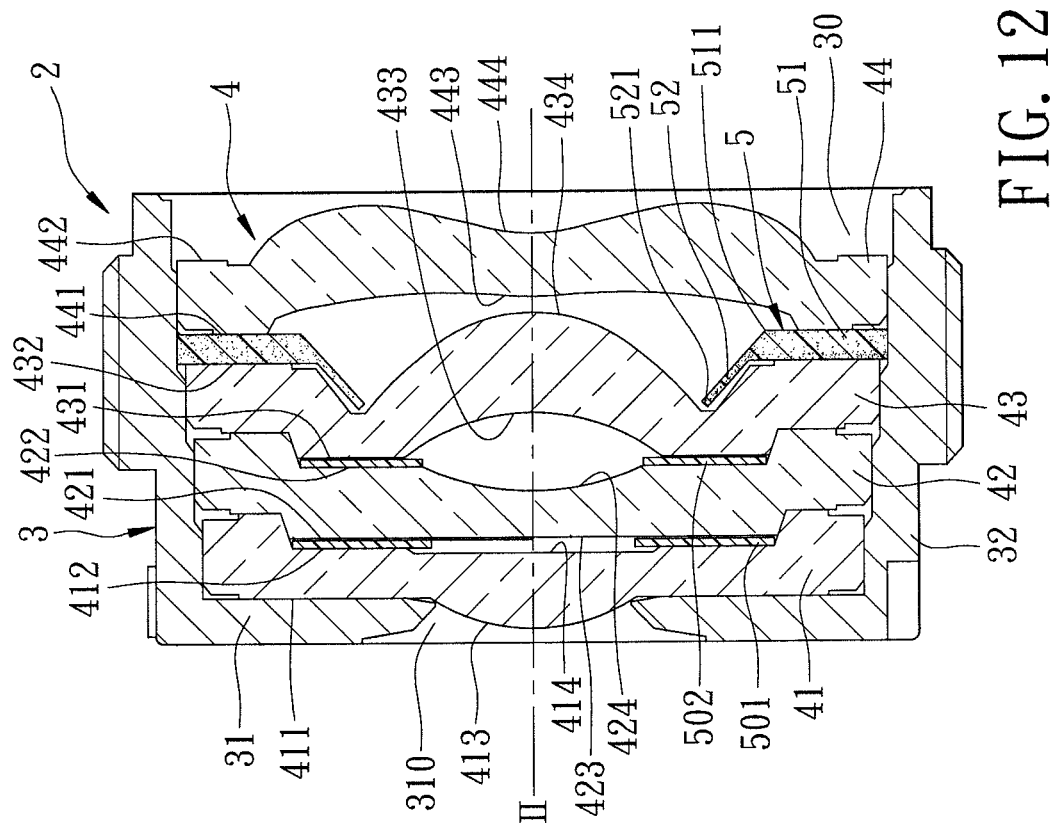
FIG. 12 is a schematic diagram showing a seventh preferred embodiment of the imaging lens according to the present invention.

Referring to FIG. 12, a seventh preferred embodiment of the imaging lens 2 is shown to be similar to the first preferred embodiment. The difference between the first and seventh preferred embodiments of the imaging lens 2 of this invention resides in that: the light shielding plate 5 is made using injection molding, and the fixing portion 51 of the light shielding plate 5 is thus thicker, so as to have a washer-like functionality. By such a design, the thickness between the front and back contact surfaces of each of the imaging components that are adjacent to the light shielding plate may be reduced, so as to favor production of the imaging components. In this embodiment, a thickness of the fixing portion 51 of the light shielding plate 5 is 0.2 mm, whereas in the first preferred embodiment, the thickness of the fixing portion 51 of the light shielding plate 5 is about 0.02 mm.

It should be noted that number of the light shielding plate 5 of the imaging lens 2 is not limited. Each of the light shielding plates in each of the above embodiments may employ the light shielding plate 5 that has the bent structure for enhancing image quality of the imaging lens 2. In addition, the bent portion 52 of the light shielding plate 5 is not limited to be planar, and may be wave-shaped, stair-shaped, or arc-shaped, to fit various surface configurations of the imaging components.

To sum up, the light shielding plate 5 may be designed to cooperate with various imaging units 4 and the lens barrel 3 to form the imaging lens 2 of this invention for effectively blocking stray light and achieving better imaging quality using the bent portion 52, and is steadily positioned via the fixing portion 51 to achieve a relatively better assembly precision and easier assembly.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising:
   a lens barrel including a base wall formed with a light incident hole around an optical axis of said imaging lens and disposed proximate to an object side, and a surrounding wall that extends from an outer periphery of said base wall toward an image side, and that cooperates with said base wall to define a receiving space;
   an imaging unit disposed in said receiving space of said lens barrel, and including a plurality of imaging components arranged along the optical axis in an order, each of said imaging components having an annular front contact surface facing toward the object side and an annular back contact surface facing toward the image side; and
   a light shielding plate having a fixing portion that is planar and annular, and a bent portion bent from an inner periphery of said fixing portion and extending slantingly toward the optical axis, said light shielding plate being disposed at one of:
   a first position between said base wall and one of said imaging components that is adjacent to said base wall of said lens barrel, said fixing portion being located between said base wall and said front contact surface of said one of said imaging components that is adjacent to said base wall of said lens barrel; and
   a second position between two adjacent ones of said imaging components, said fixing portion being located between said back contact surface of one of the two adjacent ones of said imaging components that is disposed at the object side of said light shielding plate and said front contact surface of the other one of said two adjacent ones of said imaging components.

2. The imaging lens as claimed in claim 1, wherein each of said imaging components is a lens, and said light shielding plate is disposed at the second position, each of said imaging components having a curved object-side surface surrounded by said front contact surface thereof and a curved image-side surface surrounded by said back contact surface thereof.

3. The imaging lens as claimed in claim 2, wherein each of said object-side and image-side surfaces of each of said imaging components has an optical effective diameter area for passage of light for imaging,
   two of said imaging components that are adjacent to and respectively disposed at two sides of said light shielding plate defining an imaging light boundary surface therebetween, the imaging light boundary surface extending from a periphery of said optical effective diameter area of said image-side surface of one of said two of said imaging components that is disposed at the object side of said light shielding plate to a periphery of said optical effective diameter area of said object-side surface of the other one of said two of said imaging components that is disposed at the image side of said light shielding plate, said bent portion of said light shielding plate being spaced apart from the imaging light boundary surface.

4. The imaging lens as claimed in claim 2, wherein a periphery of each of said object-side and image-side surfaces of each of said imaging components defines a light-passing boundary periphery, an inner periphery of said bent portion of said light shielding plate being spaced apart from an adjacent one of said light-passing boundary peripheries of said imaging components by a distance ranging between 0.1 mm and 0.4 mm.

5. The imaging lens as claimed in claim 1, further comprising a washer disposed between two adjacent ones of said imaging components, wherein said light shielding plate is disposed at the second position, and said fixing portion of said light shielding plate is located at one of:
   a position between said washer and said back contact surface of one of the two adjacent ones of said imaging components that is disposed at the object side of said washer, and
   a position between said washer and said front contact surface of one of the two adjacent ones of said imaging components that is disposed at the image side of said washer.

6. The imaging lens as claimed in claim 5, wherein each of said imaging components of said imaging unit has a curved object-side surface surrounded by said front contact surface thereof and allowing passage of light, and a curved image-side surface surrounded by said back contact surface thereof and allowing passage of light, each of said object-side and image-side surfaces of each of said imaging components having an optical effective diameter area for passage of light for imaging,
   two of said imaging components that are adjacent to and respectively disposed at two sides of said washer defining an imaging light boundary surface therebetween, the imaging light boundary surface extending from a periphery of said optical effective diameter area of said image-side surface of one of said two of said imaging components that is disposed at the object side of said washer to a periphery of said optical effective diameter area of said object-side surface of the other one of said two of said imaging components that is disposed at the image side of said washer, said bent portion of said light shielding plate extending toward one of said two of said imaging components that are adjacent to said washer.

7. The imaging lens as claimed in claim 5, wherein each of said imaging components of said imaging unit has a curved object-side surface surrounded by said front contact surface thereof and a curved image-side surface surrounded by said back contact surface thereof, a periphery of each of said object-side and image-side surfaces of each of said imaging components defining a light-passing boundary periphery, an inner periphery of said bent portion of said light shielding plate being spaced apart from an adjacent one of said light-passing boundary peripheries of said imaging components by a distance ranging between 0.1 mm and 0.4 mm.

8. The imaging lens as claimed in claim 1, wherein said light shielding plate is disposed at the first position, and said bent portion of said light shielding plate extends toward said light incident hole.

9. The imaging lens as claimed in claim 8, wherein each of said imaging components of said imaging unit has a curved object-side surface surrounded by said front contact surface thereof and a curved image-side surface surrounded by said back contact surface thereof, said object-side surface of one of said imaging components that is adjacent to said base wall of said lens barrel having an optical effective diameter area for passage of light for imaging, a distance between an inner periphery of said bent portion of said light shielding plate and the optical axis being greater than half a diameter of the optical effective diameter area.

10. The imaging lens as claimed in claim 8, wherein each of said imaging components of said imaging unit has a curved object-side surface surrounded by said front contact surface thereof and allowing passage of light, and a curved image-side surface surrounded by said back contact surface thereof and allowing passage of light, a periphery of each of said object-side and image-side surfaces of each of said imaging components defining a light-passing boundary periphery, an inner periphery of said bent portion of said light shielding plate being spaced apart from an adjacent one of said light-passing boundary peripheries of said imaging components by a distance ranging between 0.1 mm and 0.4 mm.

* * * * *